(12) United States Patent
Kim et al.

(10) Patent No.: US 6,816,506 B1
(45) Date of Patent: Nov. 9, 2004

(54) FRACTIONAL E1 LINK DEVICE BETWEEN BASE STATION AND BASE STATION CONTROLLER

(75) Inventors: Si Deog Kim, Seoul (KR); Hyun Woo Ha, Anyang (KR)

(73) Assignee: Hyundai Electronics Ind. Co., Ltd., Kyungki-do (KR)

( * ) Notice: Subject to any disclaimer, the term of this patent is extended or adjusted under 35 U.S.C. 154(b) by 851 days.

(21) Appl. No.: 09/717,528

(22) Filed: Nov. 21, 2000

(30) Foreign Application Priority Data

Dec. 17, 1999 (KR) ........................ 1999-58717

(51) Int. Cl.[7] ................................ H04J 3/16
(52) U.S. Cl. ........................ 370/465; 370/503
(58) Field of Search ................ 370/328, 350, 370/503, 465, 466

(56) References Cited

U.S. PATENT DOCUMENTS

| | | | |
|---|---|---|---|
| 4,583,008 A | * | 4/1986 | Grugett ........................ 327/15 |
| 5,495,516 A | * | 2/1996 | Lee et al. ................ 379/14.01 |
| 5,740,168 A | | 4/1998 | Nakamura et al. |
| 5,812,786 A | * | 9/1998 | Seazholtz et al. ........... 709/233 |
| 5,862,492 A | | 1/1999 | Leppanen et al. |
| 5,913,167 A | | 6/1999 | Bonta et al. |
| 5,973,989 A | * | 10/1999 | Pawlowski .................. 365/233 |

* cited by examiner

Primary Examiner—Chi Pham
Assistant Examiner—Keith M. George
(74) Attorney, Agent, or Firm—Merchant & Gould P.C.

(57) ABSTRACT

The fractional E1 link device between a base station and a base station controller, in a link interface between the base station and the base station controller for a mobile communication system, includes: a clock converter for receiving a frame sync clock and a system clock, and converting the system clock to a clock corresponding to the number of subscribers; a processor in synchronism with the output clock of the clock converter, for interfacing transmission/reception data of the base station; a framer/transceiver in synchronism with the frame sync clock and the system clock, for framing the output data of the processor to specific time slots in conformity with a fractional E1 link, and transmitting data received on the fractional E1 link to the processor; and a multiplexer/demultiplexer for multiplexing data received from a different base station from that of the framer/transceiver, transmitting the multiplexed data on a E1/T1 link, demultiplexing data received on the E1/T1 link, and transmitting the demultiplexed data to the framer/transceiver of each base station, thereby allowing the system to use necessary E1/T1 channels only.

8 Claims, 3 Drawing Sheets

FRACTIONAL E1 LINK DEVICE BETWEEN BASE STATION AND BASE STATION CONTROLLER

BACKGROUND OF THE INVENTION

1. Field of the Invention

The present invention relates to a link implement between a base station and a base station controller in a digital mobile communication system such as digital cellular system (DCS) or personal communication system (PCS) and, more particularly, to a fractional E1 link device between a base station and a base station controller, in which the E1/T1 links between the base station and the base station controller are divided by time slots.

2. Description of the Related Art

In a digital mobile communication system (e.g., DCS or PCS), the full E1/T1 link between a base station and a base station controller is used to transmit and receive data in a framed and unchannelized manner, with the transmission/reception data being in the form of HDLC.

The digital mobile communication system has a network structure that the full E1/T1 link is assigned to all base stations irrespective of the capacity of the individual base stations.

The full E1 link consists of 32 time slots each of which has a capacity of 64 Kbps in (FIG. 4). The full T1 link consists of 24 time slots each having a capacity of 64 Kbps in (FIG. 3).

However, every subscriber in the code division multiple access (CDMA) digital mobile communication system has a capacity of about 21.368 Kbps.

In the CDMA system, data are transmitted and received in the form of packet over E1/T1 trucks between the base station and the base station controller. The individual packets have a structure as presented in Table 1.

The packet gap is 6 bytes in the packet-based data communication system.

TABLE 1

| Div. | Length (Byte) Traffic Data | Length (Byte) Control Data |
| --- | --- | --- |
| Start Flag | 1 | 1 |
| Header | 10 | 16 |
| Main Data | Traffic: 2–22, Control: 16 | Max. 128 |
| CRC | 2 | 2 |
| End Flag | 1 | 1 |
| Total | 32–52 | Max. 148 |

Also, traffic data appears every 20 ms in the CDMA system and the traffic varies depending on the activity of the voice as presented in Table 2.

TABLE 2

| | Length (Byte) | Occurrence Probability |
| --- | --- | --- |
| Full Rate | 22 | 0.291 |
| Half Rate | 10 | 0.039 |
| Fourth Rate | 5 | 0.072 |
| Eighth Rate | 2 | 0.598 |

The traffic in the CDMA system includes traffic data of the subscribers and control data for control of the traffic data. The individual packets have a pattern of IPC packet, which is a modified HDLC. Thus the characteristic of the HDLC must be taken into consideration in calculating the actual data rate over the truck.

The actual data rate is determined as follows:

In the calculation, traffic data, HDLC-related zero insertion and flag, CRC (FCS) and packet gap are necessary.

Traffic=$\{(52\times0.291)+(40\times0.039)+(35\times0.072)+(32\times0.598)\}\times8$ bits Zero insertion (3% assumption)=traffic per one channel (excepting flags)$\times0.03=9$ bits Packet gap=6 bytes=48 bits Assuming that the control packet appears with 50% of the occurrence probability of the traffic packet, HDLC-related zero insertion and flag, CRC and packet gap.

Traffic per one channel=$148\times8$ bits=1184 bits Zero insertion (3% assumption)=traffic per one channel (excepting flags)$\times0.03=35$ bits Packet gap=6 bytes=48 bits The average packet length amounts to 1268 bits and appears 2.5 times per second with 50% of the occurrence probability of the traffic packet, at the data rate of 3168 bps.

As well known in the art, one channel has a capacity of 21.368 Kbps.

The generated packet data are transmitted to the trunk on the E1/T1 link in an unchannelized manner.

In transmission over the E1 link, the gross data capacity is 1920 kbit (=2048 kbit–128 kbit) (excepting time slots 0 and 16) with a traffic channel capacity of 90 channels (=1920 kbit/21.368 kbit).

In transmission over the T1 link, the gross data capacity is 1536 kbit (=1544 kbit–8 kbit) (excepting flame bits) with a traffic channel capacity of 72 channels (=1536 kbit/21.368 kbit).

That is, the maximum number of subscribers is 90 on the full E1 link and 72 on the full T1 link.

Accordingly, this trunk line has an excess of capacity relative to a base station of a low capacity designed to support no more than 20 to 40 subscribers. Such a waste of capacity of the trunk line causes a rent cost for unnecessary designated links, resulting in a considerable economic loss of the mobile communication company.

SUMMARY OF THE INVENTION

It is, therefore, an object of the present invention to provide a fractional E1 link device between a base station and a base station controller, in which the E1/T1 links between the base station and the base station controller are divided by time slots.

To achieve the above object of the present invention, there is provided a fractional E1 link device between a base station and a base station controller in a ink interface between the base station and the base station controller for a mobile communication system the fractional E1 link device including: a clock converter for receiving a frame sync clock and a system clock, and converting the system clock to a clock corresponding to the number of subscribers; a processor in synchronism with the output clock of the clock converter, for interfacing transmission/reception data of the base station; a framer/transceiver in synchronism with the frame sync clock and the system clock, for framing the output data of the processor to specific time slots in conformity with a fractional E1 link, and transmitting data received on the fractional E1 link to the processor; and a multiplexer/demultiplexer for multiplexing data received from a different base station from that of the framer/transceiver, transmitting the multiplexed data on a E1/T1 link, demultiplexing data received on the E1/T1 link, and transmitting the demultiplexed data to the framer/transceiver of each base station.

In another aspect of the present invention, there is provided a fractional E1 link device between a base station and a base station controller in a link interface between the base station and the base station controller for a mobile communication system, the fractional E1 link device including: a clock converter for receiving a frame sync clock and a system clock, and converting the system clock to a clock corresponding to the number of subscribers; a processor in synchronism with the output clock of the clock converter, for interfacing transmission/reception data of the base station controller; a framer/transceiver in synchronism with the frame sync clock and the system clock, for framing the output data of the processor to specific time slots in conformity with a fractional E1 link, and transmitting data received on the fractional E1 link to the processor; and a multiplexer/demultiplexer for multiplexing data received from a different base station controller from that of the framer/transceiver, transmitting the multiplexed data on a E1/T1 link, demultiplexing data received on the E1/T1 link, and transmitting the demultiplexed data to the framer/transceiver of each base station controller.

DETAILED DESCRIPTION OF THE PREFERRED EMBODIMENT

Hereinafter, a preferred embodiment of the present invention will be described in detail with reference to the accompanying drawings.

Figure 1:
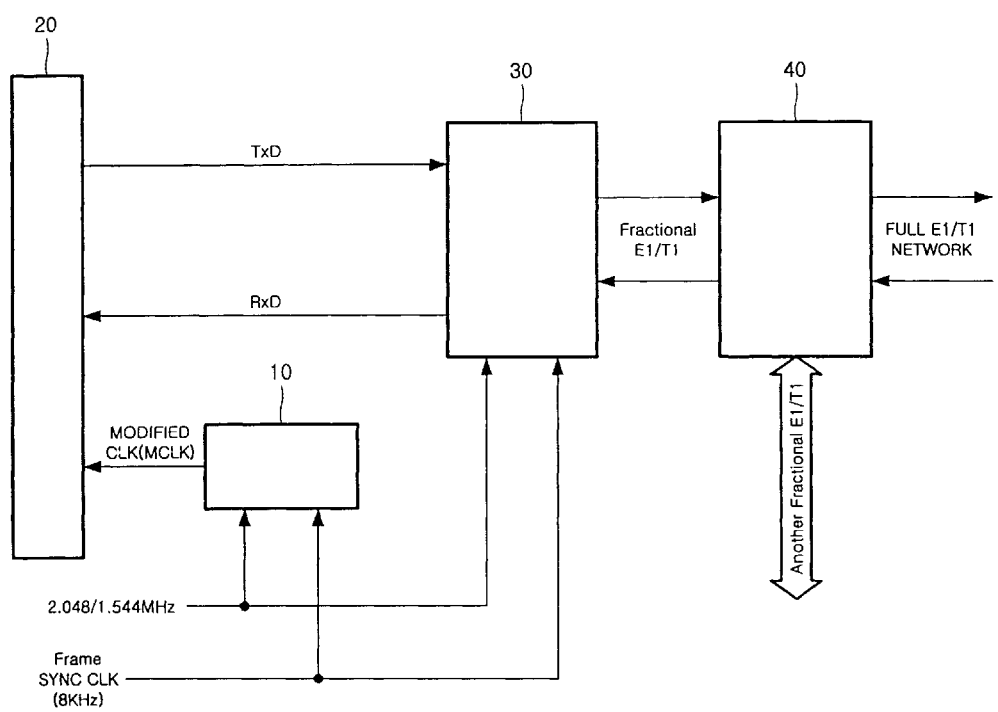
FIG. 1 is a schematic block diagram of a fractional E1 link device between a base station and a base station controller according to the present invention.

FIG. 1 is a schematic block diagram of a fractional E1 link device between a base station and a base station controller according to the present invention.

In the figure, the fractional E1 link device comprises a clock converter 10 for receiving a frame sync clock and a system clock and converting the system clock to a clock corresponding to the number of subscribers; a processor 20 synchronized with the output clock of the clock converter 10, for interfacing transmission/reception data of the base station or the base station controller, a framer/transceiver 30 synchronized with the frame sync clock and the system clock, for framing the output data of the processor 20 to specific time slots in conformity with the fractional E1 link an sending data received over the fractional E1 link to the processor 20; and a multiplexer/demultiplexer 40 for multiplexing data received from a different base station or base station controller from that of the framer/transceiver 30 in the corresponding base station/base station controller.

A description will now be given to an operation of the fractional E1 link device between the base station and the base station controller according to the present invention.

Figure 3:
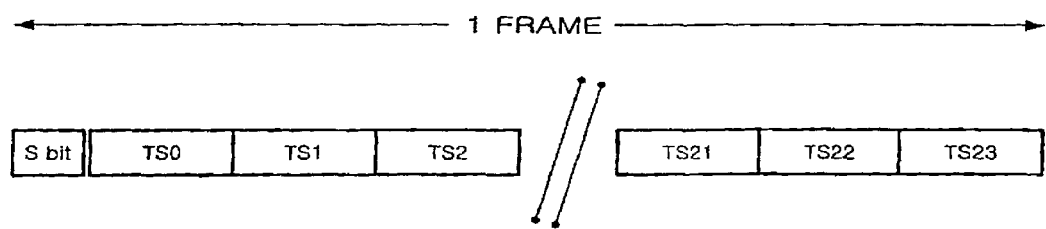
FIG. 3 is a schematic diagram of a general T1 frame.

In regard to the T1 link, as shown in FIG. 3, one frame consists of 24 time slots each having a capacity of 8 bits and terminates with one bit (s-bit) indicating the start of every frame. So, one frame on the T1 link consists of 193 bits, out of which 192 bits are used for data and 1 bit (s-bit) is used to indicate the start of the frame. The frame iteratively appears 8000 times per second and thus one time slot has a capacity of 64 kbps (=8 bits×8000).

Figure 4:
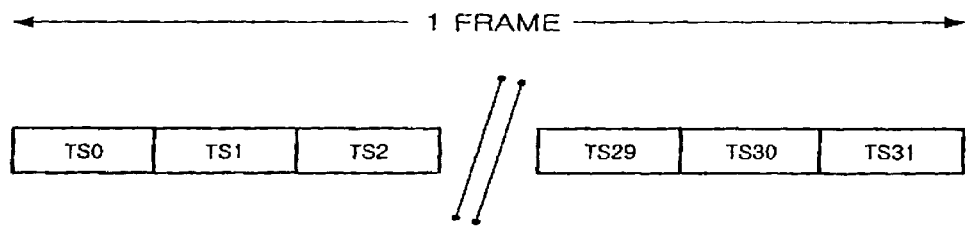
FIG. 4 is a schematic diagram of a general E1 frame.

Now, in regard to the E1 link, as shown in FIG. 4, one frame consists of 32 time slots each of which is 8 bits. The time slot (TS#0) indicating the start of every frame is used for acquiring frame synchronization and checking various errors. This time slot is not used as a data time slot. So, one frame on the E1 link consists of 2048 bits, out of which 1984 bits are used for data and the rest bits, i.e., TS#0 indicate the start of the frame. The frame iteratively appears 8000 times per second and thus one time slot has a capacity of 64 kbps (=8 bits×8000).

As well known in the art, the E1/T1 link has a predetermined number of available time slots assigned to one frame. In the conventional full E1/T1 system, HDLC data are transmitted and received with 31 time slots for the E1 link and with 24 time slots for the T1 link.

Contrarily, the present invention designates a limited number of time slots for data transmission and reception, modifies a sync communication clock so as to transmit/receive packet data on the time slots, and makes the processor transmit/receive the packet data using the modified clock, so that the capacity of the trunk line is essentially equal to that of the base station.

That is, the clock converter 10 shown in FIG. 1 receives a frame-discriminating frame sync clock of 8 KHz (FIG. 2a) and a system bus clock of 1.544 MHz/2.048 MHz (FIG. 2b) and converts the clocks so as to use necessary time slots only, thereafter sending the converted clocks to the processor 20. FIG. 2c shows a modified clock (M2MCLK), FIG. 2d reception data transferred from the network to the system, FIG. 2e transmission data transferred from the system to the network, FIG. 2f a E1/T1 channel number (time slot).

Figure 2:
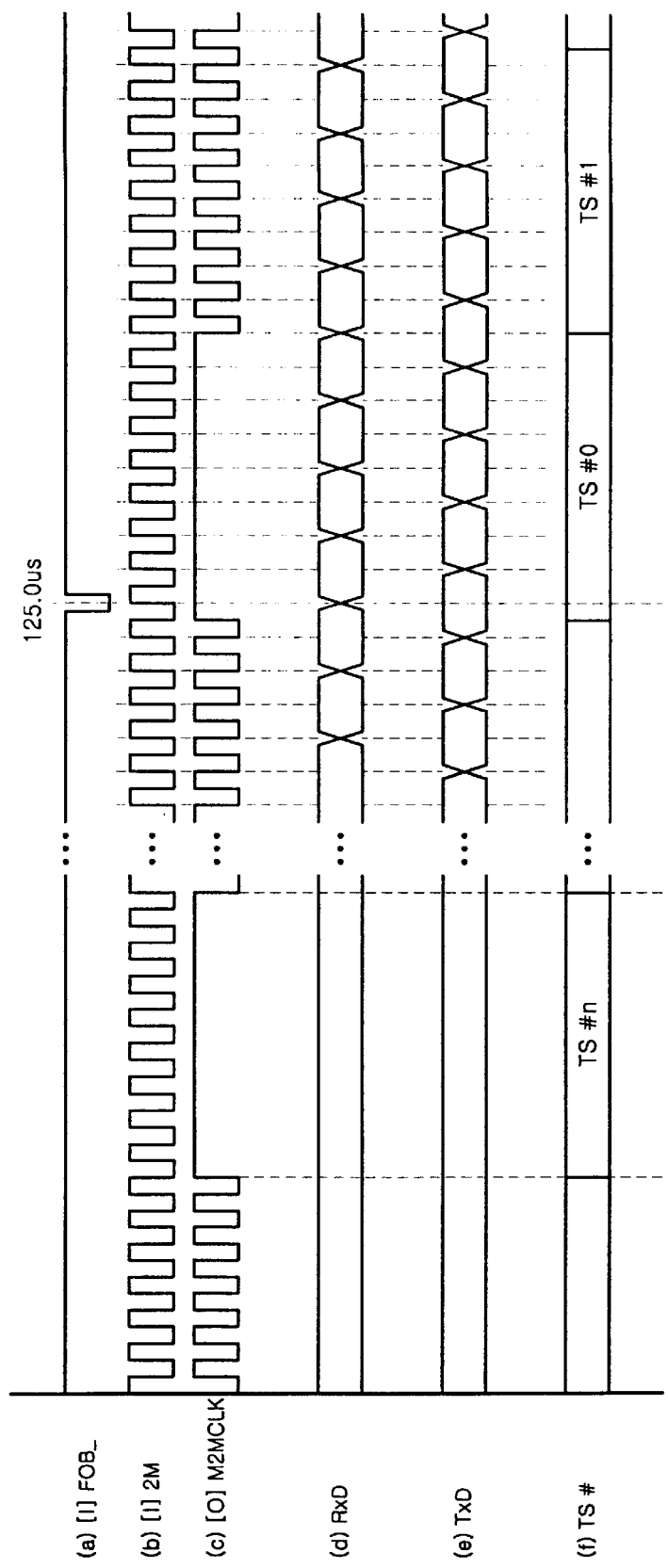
FIG. 2 is a timing diagram for explaining a full E1/T1 link between the base station and the base station controller shown in FIG. 1.

The timing diagram of FIG. 2 describes a situation that the system clock corresponds to 1.544 MHz. If the system clock is 2.048 MHz, clock masking is also required to unused channels according to the mapping rule.

The timing diagram of FIG. 2 entirely illustrates one frame with eight unused time slots each consisting of 8 bits. The clock converter 10 generates a modified clock as shown in FIG. 2c and sends the clock to the processor 20.

The processor 20 transmits the data at the falling edge of the modified clock and receives the data at the rising edge of the clock, as shown in FIGS. 2d and 2e, respectively.

As the edges of the clock are masked, the data on time slot #n and time slot #0 are meaningless data not sampled at the reception party.

The transmission party transmits the data only with a desired number of time slots and the reception party processes the data without using the time slots assigned to the system as meaningless data.

The transmission data are transferred to the framer/transceiver 30, which then frames the transmission data in conformity with the frame of the fractional E1 link. Then, the multiplexer/demultiplexer 40 multiplexes the transmission data received from the framer/transceiver 30 with link channels of a different base station, thereafter sending the multiplexed transmission data on the E1/T1 link.

Meanwhile, the reception data on the E1/T1 link are demultiplexed at the multiplexer/demultiplexer 40 in the reverse procedure of the above-stated multiplexing process and transmitted to the framer/transceiver of the corresponding base station.

The reception data are processed at the framer/transceiver 30 and transmitted to the processor 20, which receives the reception data at the rising edge of the modified clock output from the clock converter 10.

For the purpose of illustration, the description has been given for a base station only, but the invention can be applied to a base station controller by modifying the processor 20 so as to transmit and receive data of the base station controller, thereby allowing the base station controller to interface the data on the fractional E1 link.

As described above, the fractional E1 link device between a base station and a base station controller according to the present invention uses necessary channels only based on to the number of time slots used by the subscribers without using all E1/T1 channels, thereby reducing the number of channels used in the base station of a low capacity and hence the rent cost of trunk lines in the mobile communication company.

Furthermore, the present invention provides diversity in the interface between the base station and the base station controller according to the type of the base station, which enables efficient utilization of channels between the base station and the base station controller.

It is to be noted that like reference numerals denote the same components in the drawings, and a detailed description of generally known function and structure of the present invention will be avoided lest it should obscure the subject matter of the present invention.

What is claimed is:

1. A fractional E1 link device between a base station and a base station controller, which corresponds to a link interface between the base station and the base station controller in a mobile communication system, the fractional E1 link device comprising:

a clock converter for receiving a frame sync clock and a system clock, and converting the system clock to a clock corresponding to the number of subscribers;

a processor in synchronism with the output clock of the clock converter, for interfacing transmission/reception data of the base station;

a framer/transceiver in synchronism with the frame sync clock and the system clock, for framing the output data of the processor to specific time slots in conformity with a fractional E1 link, and transmitting data received on the fractional E1 link to the processor; and a multiplexer/demultiplexer for multiplexing data received from a different base station from that of the framer/transceiver, transmitting the multiplexed data on a E1/T1 link, demultiplexing data received on the E1/T1 link, and transmitting the demultiplexed data to the framer/transceiver of each base station.

2. The fractional E1 link device as claimed in claim 1, wherein the processor transmits the data at a falling edge of the output clock of the clock converter and receives the data at a rising edge of the output clock.

3. The fractional E1 link device as claimed in claim 1, wherein the framer/transceiver receives the data at a falling edge of the frame sync clock and transmits the data at a rising edge of the frame sync clock.

4. The fractional E1 link device as claimed in claim 1, wherein the framer/transceiver frames the data only to time slots not masked at the edge of the clock, when fractionally framing the data to specific time slots in transmission of the data.

5. A fractional E1 link device between a base station and a base station controller, which corresponds to a link interface between the base station and the base station controller in a mobile communication system, the fractional E1 link device comprising:

a clock converter for receiving a frame sync clock and a system clock, and converting the system clock to a clock corresponding to the number of subscribers;

a processor in synchronism with the output clock of the clock converter, for interfacing transmission/reception data of the base station controller;

a framer/transceiver in synchronism with the frame sync clock and the system clock, for framing the output data of the processor to specific time slots in conformity with a fractional E1 link, and transmitting data received on the fractional E1 link to the processor; and a multiplexer/demultiplexer for multiplexing data received from a different base station controller from that of the framer/transceiver, transmitting the multiplexed data on E1/T1 link, demultiplexing data received on the E1/T1 link, and transmitting the demultiplexed data to the framer/transceiver of each base station controller.

6. The fractional E1 link device as claimed in claim 5, wherein the processor transmits the data at a falling edge of the output clock of the clock converter and receives the data at a rising edge of the output clock.

7. The fractional E1 link device as claimed in claim 5, wherein the framer/transceiver receives the data at a falling edge of the frame sync clock and transmits the data at a rising edge of the frame sync clock.

8. The fractional E1 link device as claimed in claim 5, wherein the framer/transceiver frames the data only to time slots not masked at the edge of the clock, when fractionally framing the data to specific time slots in transmission of the data.

* * * * *